(12) United States Patent
Rowitch et al.

(10) Patent No.: US 8,866,588 B2
(45) Date of Patent: Oct. 21, 2014

(54) SYSTEMS, METHODS, AND COMPUTER PROGRAM PRODUCTS FOR REFRESHING DATA

(75) Inventors: Douglas Neal Rowitch, Del Mar, CA (US); Zoltan Biacs, San Mateo, CA (US); Ravikumar Varma Dandu, San Diego, CA (US); Donovan Trisko, San Diego, CA (US); Jie Wu, San Diego, CA (US); John Delucchi, Santa Cruz, CA (US); Grant Alexander Marshall, Campbell, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1232 days.

(21) Appl. No.: 12/464,793

(22) Filed: May 12, 2009

(65) Prior Publication Data
US 2010/0141470 A1    Jun. 10, 2010

Related U.S. Application Data

(60) Provisional application No. 61/120,017, filed on Dec. 4, 2008.

(51) Int. Cl.
| | | |
|---|---|---|
| G08B 5/22 | (2006.01) | |
| H04L 12/801 | (2013.01) | |
| G01S 19/25 | (2010.01) | |
| G01S 19/05 | (2010.01) | |

(52) U.S. Cl.
CPC ............... *G01S 19/258* (2013.01); *H04L 47/12* (2013.01); *G01S 19/05* (2013.01)
USPC .. 340/6.1; 455/433; 342/357.66; 342/357.67; 342/357.74

(58) Field of Classification Search
CPC ....... G01S 19/05; G01S 19/258; H04L 47/12; G06K 7/10019; G06K 7/10029
USPC ............... 340/6.1, 6.11, 8.1, 10.1, 10.2, 10.3, 340/10.31, 539.1, 539.11, 539.13; 455/433, 455/456, 456.1, 456.2, 456.3, 404.2; 342/357.01, 357.06, 357.12, 357.15
See application file for complete search history.

(56) References Cited

U.S. PATENT DOCUMENTS 5,425,032 A * 6/1995 Shloss et al. ................... 370/346
6,784,806 B1 * 8/2004 Lee et al. ................. 340/870.02
(Continued)

FOREIGN PATENT DOCUMENTS

| CN | 1930791 A | 3/2007 |
|---|---|---|
| JP | 2005189173 A | 7/2005 |

(Continued)

OTHER PUBLICATIONS

English Translation of JP 2006-162265A.*

(Continued)

*Primary Examiner* — Nabil Syed
(74) *Attorney, Agent, or Firm* — Arnold J. Gum

(57) ABSTRACT

A method performs an update for a first device that consumes information with a known expiration time. The first device operates within a network that accommodates other devices also consuming the information. The method includes setting a time for the first device to refresh the information, the time to refresh being based on a pseudorandom time offset. The method also includes sending a refresh request to a resource for the data during the set time.

32 Claims, 4 Drawing Sheets

(56) References Cited

U.S. PATENT DOCUMENTS

| | | | |
|---|---|---|---|
| 2002/0046226 A1* | 4/2002 | Nakabe et al. | 708/250 |
| 2004/0263386 A1* | 12/2004 | King et al. | 342/357.06 |
| 2005/0273832 A1* | 12/2005 | Zigmond et al. | 725/112 |
| 2007/0085689 A1 | 4/2007 | Brommer et al. | |
| 2009/0122773 A1 | 5/2009 | Gogic | |
| 2009/0303014 A1* | 12/2009 | Brommer et al. | 340/10.2 |

FOREIGN PATENT DOCUMENTS

| | | | |
|---|---|---|---|
| JP | 2006162265 A * | 6/2006 | |
| JP | 2007521481 A | 8/2007 | |
| TW | 378299 B | 1/2000 | |
| TW | 200823740 A | 6/2008 | |
| TW | 200939814 A | 9/2009 | |
| WO | 2005006593 A1 | 1/2005 | |
| WO | 2007025061 A2 | 3/2007 | |

OTHER PUBLICATIONS

International Search Report and Written Opinion—PCT/US2009/066186—ISA/EPO—Mar. 26, 2010.
Taiwan Search Report—TW098141416—TIPO—Mar. 5, 2013.
Taiwan Search Report—TW098141416—TIPO—Oct. 22, 2013.
Taiwan Search Report—TW098141416—TIPO—Apr. 15, 2014.

* cited by examiner

SYSTEMS, METHODS, AND COMPUTER PROGRAM PRODUCTS FOR REFRESHING DATA

CROSS REFERENCE TO RELATED APPLICATION

This application claims the benefit of U.S. Provisional Patent Application No. 61/120,017, filed Dec. 4, 2008, entitled "Systems, Methods, and Computer Program Products for Refreshing Data," which is expressly incorporated herein by reference in its entirety.

TECHNICAL FIELD

The present description is generally directed to techniques for updating information and, more specifically, to techniques for updating information in a system that utilizes periodic information refreshes.

BACKGROUND

Many mobile devices currently include a location-determining ability, usually based on a Satellite Positioning System (SPS), such as Global Positioning Satellite (GPS) technology. For mobile phones, a common location-determining technology is Assisted GPS (AGPS), where at least some of the data used for calculating position is supplied by an assistance server, rather than (or in addition to) directly from a satellite. For example, some mobile devices receive ephemeris data from assistance servers.

Ephemeris data provides precise orbital information for a given Space Vehicle (SV). In current GPS systems, for example, ephemeris data is usually considered reliable for a four-hour window, X−2 to X+2, where X is a time, usually an even hour. When an AGPS-enabled device initiates a positioning application, it requests information from the assistance server, including requesting ephemeris data for SVs that are visible and for some SVs which may be expected to become visible within a short (usually 4-hour) window.

The ephemeris data for most, or nearly all, space vehicles expires at or near an even hour time (e.g., two o'clock, four o'clock, etc.). Thus, even though a mobile device may have powered up or otherwise activated its location-based service at a time different from an even hour, the chances are high that the mobile device will request a refresh of the ephemeris data, for at least some space vehicles, at the next even hour. Within a given cell of a mobile communication network there will typically be multiple mobile devices operating, such that even hour times often see spikes in the numbers of refresh requests to assistance servers. When the spikes are large, mobile phone networks run a risk of providing poor performance to customers due to assistance server overloading. There is currently no technique available to effectively prevent refresh request spikes.

BRIEF SUMMARY

Various implementations of the invention include techniques for refreshing data that use pseudorandomly placed times for making refresh requests. In one example, a device designates a time period that is divided into a number of slots. The device then uses a randomizing algorithm to choose one or more of the slots for making a refresh request. When multiple devices, which communicate with a common resource, use the randomizing technique, the common resource sees a more uniform distribution of refresh requests over a period.

The foregoing has outlined rather broadly the features and technical advantages of the present invention in order that the detailed description that follows may be better understood. Additional features and advantages will be described hereinafter which form the subject of the claims of the invention. It should be appreciated by those skilled in the art that the conception and specific aspects disclosed may be readily utilized as a basis for modifying or designing other structures for carrying out the same purposes of the present invention. It should also be realized by those skilled in the art that such equivalent constructions do not depart from the technology of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings.

DETAILED DESCRIPTION

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile device which is capable of receiving wireless communications. The term "mobile station" is also intended to include Personal Navigation Devices (PNDs) as well as devices which communicate with PNDs, such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

Position determination techniques may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 1:
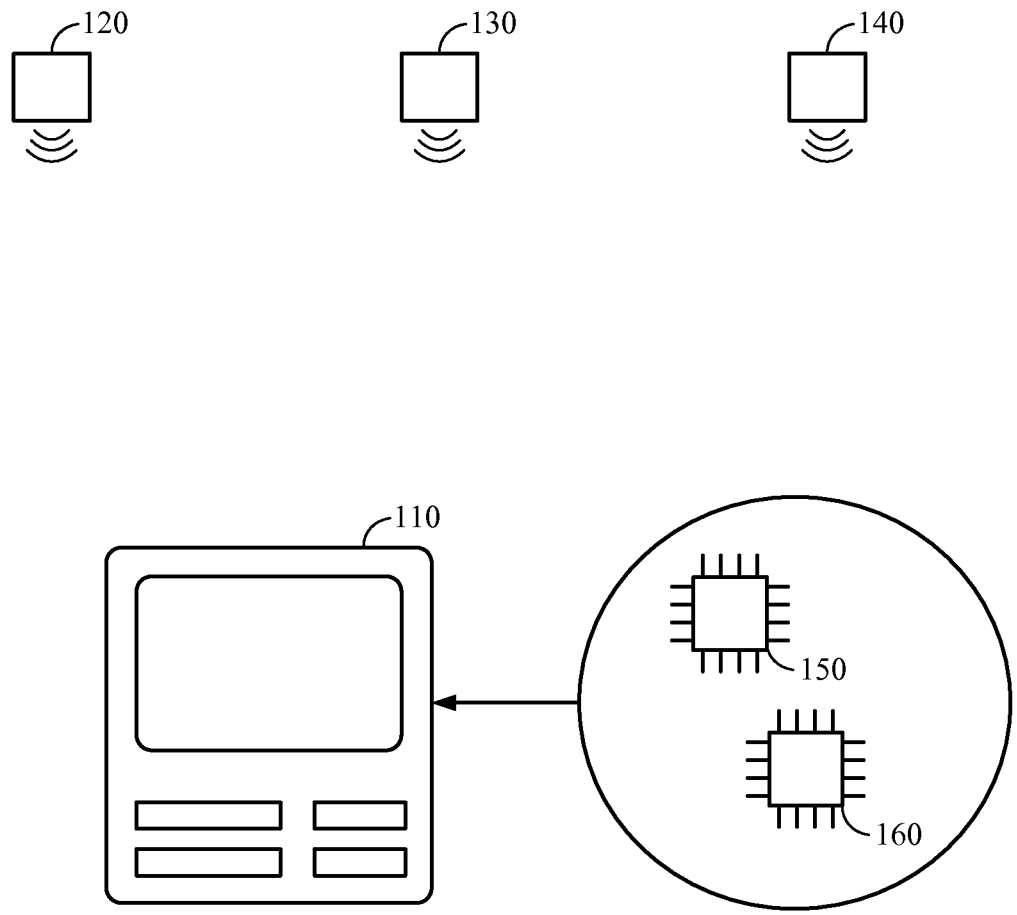
FIG. 1 is a block diagram showing an exemplary Satellite Positioning System (SPS) system with an exemplary mobile station (MS) in which an aspect of the invention may be advantageously employed.

FIG. 1 is a block diagram showing an exemplary Satellite Positioning System (SPS) with an exemplary mobile station 110 in which an aspect of the invention may be advantageously employed. The mobile station 110 may receive signals from SVs 120, 130, and 140, which may be from any present SPS or SPS developed in the future, each referred to generally herein as an SPS. An SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. As used herein, an SPS will also be understood to include pseudolite systems.

The mobile station 110 includes a processing unit 150 and a memory 160. The memory 160 is a tangible computer-readable medium that stores data and instructions that can be accessed by the processing unit 150. The processing unit 150 and memory 160 are for example only, as other examples include memory integrated within a processing unit, multiple processing units, multiple memory devices, etc. Although FIG. 1 illustrates a mobile station according to the teachings of the invention, the invention is not limited to these exemplary illustrated units. Aspects of the invention may be suitably employed in any device which refreshes data, including devices other than SPS devices and even in devices other than mobile devices.

Figure 2:
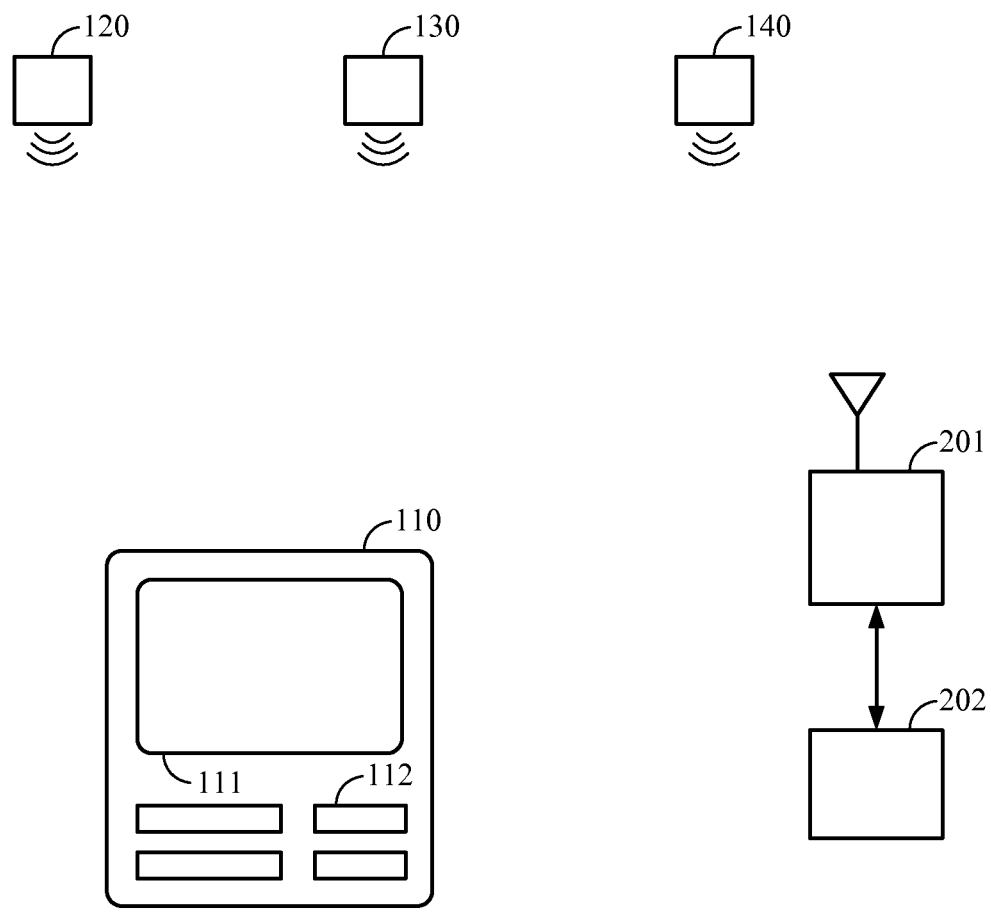
FIG. 2 is an illustration of an exemplary system adapted according to one aspect of the invention.

FIG. 2 is an illustration of an exemplary system adapted according to one aspect of the invention. The system includes the mobile station 110, which communicates with the wireless base station 201. The wireless base station 201 communicates with a Position Determination Entity (PDE) 202, which provides data to the MS 110 through the wireless base station 201.

The mobile station 110 includes a screen 111 and a keypad 112 for interaction with a user. The invention is not limited to use of the mobile station 110, as other MSs, and even stationary devices, can be used in some aspects. Furthermore, a device according to the invention can include any type or number of interfaces for interaction with a user, such as speakers, touchscreens, and the like.

In the example of FIG. 2, the mobile station 110 requests ephemeris data for the visible space vehicles 120, 130, and 140 from the position determination entity 202 using a technique that reduces spikes. The technique can be performed by the processing unit 150 (FIG. 1). In carrying out the technique in this example, the mobile station 110 uses a Time of the Earliest Ephemeris Expiration (TEEE) for the visible space vehicles. The TEEE calculation for a given space vehicle, sv, is given by relation (1), where TOE(sv) is Time Of Ephemeris of sv in the mobile station 110, and C(sv) is half the curve fit duration for sv.

$$TEEE = \min(TOE(sv) + C(sv)) \tag{1}$$

For purposes of this discussion, TOE indicates the central time of the ephemeris valid period. The mobile station 110 may use the parameters in the ephemeris data to do polynomial curve fitting and thus calculate the accurate position of GPS satellite position at any given time. The parameters contained in the ephemeris data are only considered valid during the curve fitting interval (e.g., a four or six-hour interval centered at TOE) in order to perform accurate curve fitting. For most GPS applications, C(sv) is usually 7200 s from TOE for a four-hour curve fit interval or 10800 s from TOE for a six-hour curve fit interval, but may be different for other SPSs. TEEE is calculated for each visible space vehicle, and in some cases, for space vehicles which are about to become visible. The value of TEEE indicates the earliest time that the ephemeris of the space vehicles reaches the curve fit period end (e.g., is about to expire).

A randomization interval, a T-second period, used by the mobile station 110 begins at (TEEE+P) seconds and ends at (TEEE+P+T) seconds. P is a time period added to ensure that the position determination entity 202 has enough time to receive a new ephemeris. In most AGPS systems, P can be around sixty seconds, but can be adapted as desired for a given application.

In the present example technique, the randomization interval is divided into N slots, where N is a positive integer. N is associated with a pseudorandom number R. The mobile station 110 is assigned a slot among the N slots in which to request an ephemeris refresh for the space vehicles. The slot for the mobile station 110 begins at (TEEE+P+R*S) seconds and ends at (TEEE+P+R*S) seconds+S seconds, where S is the duration of the slot. Techniques for selecting R are discussed below.

The mobile station 110 is allowed to start a refresh session during its assigned slot (or in some instances, after its assigned slot). Periodically the mobile station 110 checks whether the current time has reached the starting time of an assigned slot. In other words, the mobile station 110 checks whether the current time is equal to or past (TEEE+P+R*S) for TEEE associated with the space vehicles. If the condition is true (e.g., if the ephemeris of at least one visible space vehicle is expiring), the mobile station 110 sends an ephemeris update request to the position determination entity 202. For typical GPS systems, workable parameters may include, but are not limited to: P=60 seconds, T=900 seconds, S=6 seconds, N=T/S=150, C=7200 seconds for a 4-hour curve fit interval, C=10800 seconds for 6-hour curve fit interval, but may be different for other SPSs.

In some implementations, functionality within the mobile station 110 can choose to mark as invalid the ephemeris data of all space vehicles for which the mobile station 110 has ephemeris data. The invalid mark causes other functionality within the mobile station 110 to trigger an ephemeris refresh session. In response to the refresh request, the position determination entity 202 provides the new ephemeris data for the set of space vehicles that are visible, and if applicable, for space vehicles that will be visible in a short period of time. The mobile station 110 receives the ephemeris data and, shortly thereafter, deletes the old ephemeris data marked as invalid.

Figure 3:
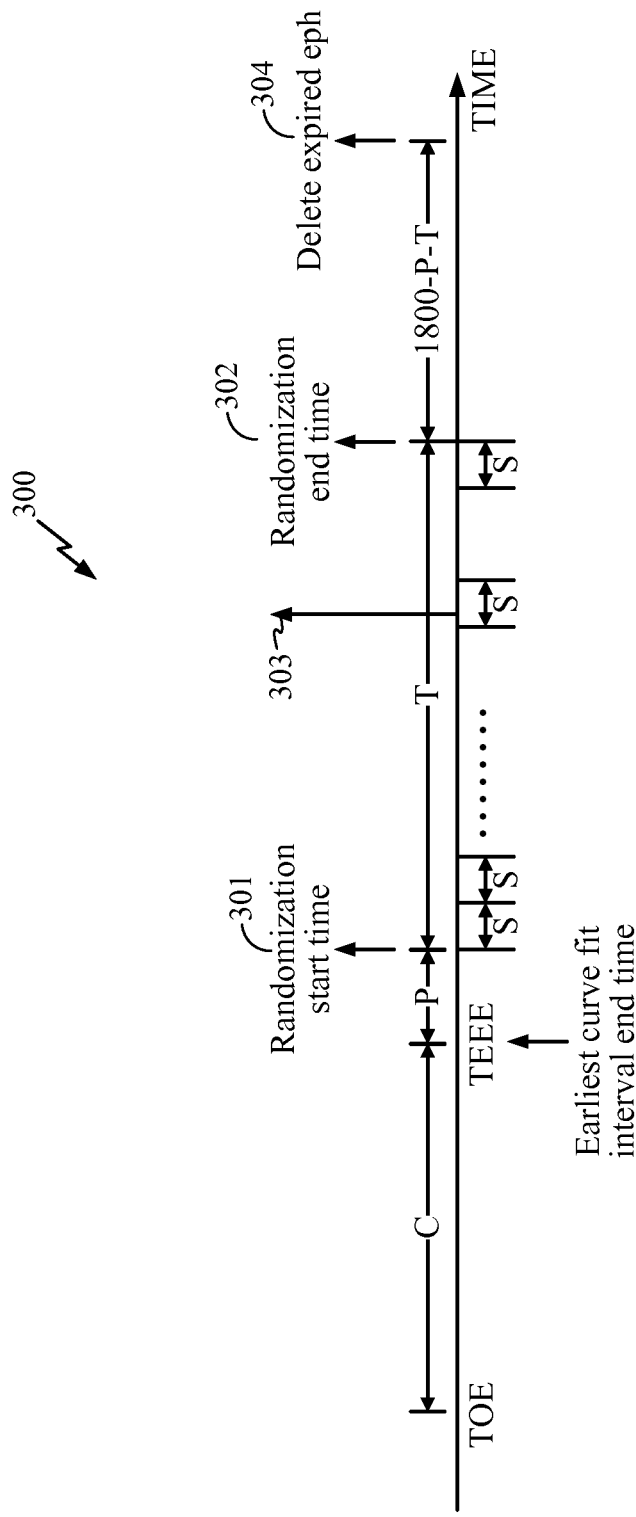
FIG. 3 is an illustration of an exemplary timeline according to one aspect of the invention.

FIG. 3 (not to scale) is an illustration of the exemplary timeline 300 according to one aspect of the invention. The timeline 300 includes, among other things, a beginning point 301 of the interval T and an end point 302 of the interval T. Within the interval T are a number (T/S) of slots, each of the slots being S seconds long. For a given MS, such as the mobile station 110, its assigned slot can be chosen pseudorandomly by functionality within the MS. In FIG. 3, an example assigned slot 303 is shown at a position which is chosen pseudorandomly. The example mobile station deletes the ephemerides that have been replaced at time 304. While FIG. 3 shows a specific time for deleting the replaced ephemeris data, it should be noted that a time for deleting replaced ephemeris data can be different in other implementations.

In this example, as long as the ephemeris data of at least one visible space vehicle is expiring, as indicated by TEEE, the refresh session is triggered for all space vehicles for which the mobile station 110 has data. In other words, in this example, the ephemeris request time is driven by the earliest (TOE+C) of all space vehicles for which the mobile station 110 has ephemeris data. The approach of this example is different from some conventional approaches, where a refresh session is not triggered as long as there are valid ephemerides for a satisfactory number (e.g., eight) of visible space vehicles. However, some implementations of the invention can be adapted to refresh one, some, or all space vehicles when it is time to refresh one space vehicle.

In some instances, ephemeris data is valid for up to six hours (i.e., a three-hour TOE), instead of four hours (i.e., a two-hour TOE). Such cases are handled by various implementations of the invention without modification of the technique described above. When ephemeris data is valid for six hours, it is generally updated every three hours at the position determination entity 202. In the mobile stations, such as in the mobile station 110, the ephemeris refresh session will normally be triggered by the two-hour TOE ephemeris, not by the three-hour TOE ephemeris. Therefore, usually there will not be refresh sessions at odd hours. Nevertheless, there are cases where a space vehicle with a curve fit interval of six hours can trigger a refresh session. For example, the ephemeris of a given space vehicle with a curve fit interval of six hours may expire first among space vehicles. In such a scenario, the refresh is triggered at an odd-numbered hour, but in subsequent sessions the refresh is triggered by the two-hour TOE ephemeris. However, in either case, the randomized time slots, when used by most or all of the mobile stations sharing the position determination entity 202, should result in a much smaller refresh spike at the position determination entity 202 on the hours. While the examples above give two-hour and three-hour TOEs as examples, various embodiments are not so limited, and various embodiments can be adapted for ephemeris data that is valid for any arbitrary length.

In another scenario, the mobile station 110 receives ephemeris data for a newly visible space vehicle. A newly visible space vehicle is a space vehicle that has become visible since the last refresh or, in some scenarios, has become visible within a very short time, such as fifteen minutes. When the position determination entity 202 receives a request for ephemeris from the mobile station 110, the request may come with a position Cell ID, enhanced Cell ID or with pilot phase measurements to enable the position determination entity 202 to determine which space vehicles are visible at the location of the mobile station 110. In other embodiments, the position determination entity 202 may be able to obtain a Cell ID or enhanced Cell ID position for the mobile station 110 via a cell ID position query within the network. The position determination entity 202 then computes which space vehicles are visible at the location of the mobile station 110. Additionally, the position determination entity 202 calculates which space vehicles will be visible in the near future at the location of the mobile station 110. There is a parameterized time window into the future that is used for the latter calculation, which is a configuration parameter of the position determination entity 202. Position determination entity supervisors are typically free to set the time window parameter to any value, although it is usually set at four hours.

Since the position determination entity 202 supplies ephemeris data for future rising space vehicles at the location of the mobile station 110, the mobile station 110 (in theory) has no need to ask for ephemeris data of the future rising space vehicles again until the expiration time since it will already have ephemeris data for the future rising space vehicles. Thus, some prior art mobile stations in the field (that do not use the technique described above) get locked into a two-hour (TOE hour) download pattern.

When there is a new space vehicle rising into view (i.e., becomes newly visible), if there is no ephemeris data (or only old/invalid ephemeris data) for the new space vehicle, the mobile station 110 will request the ephemeris data download for the new space vehicle to improve the positioning performance. In cities, there is a high likelihood that a large number of other mobile stations (not shown) are located geographically near the mobile station 110 and see the new visible space vehicle rising at about the same time. A slot-based randomization technique can be applied to this scenario as well. For instance, the randomization interval (T in the example above) can be reduced to a smaller value, for example, to 180 seconds. A shorter T allows the mobile station 110 to obtain ephemeris data for the new space vehicle at a relatively early time. The randomization start time can be set to be the time the newly visible space vehicle comes into view. The slot period can be reset or left at six seconds. The mobile station 110 then calculates an assigned slot and requests ephemeris data during that assigned slot. The mobile station 110 continues to perform periodic refreshes based on the TEEE as before.

When a new space vehicle rises into view within a short time before a TEEE, some example implementations simply wait until the TEEE to request ephemeris data. Such a feature can decrease the number of refresh requests seen by the position determination entity 202.

In an SPS, at times one or more space vehicles are considered "unhealthy." Some implementations of the invention attempt to reduce the number of refresh sessions by not triggering refresh sessions based on space vehicles that are unhealthy or may be unhealthy. One example implementation does not include data for an unhealthy space vehicle in a response by the position determination entity 202 to a refresh request by the mobile station 110. The mobile station 110 knows that when the response of the position determination entity 202 does not include data for a given space vehicle, then the given space vehicle should not be a triggering factor for a subsequent refresh session. Furthermore, when a response from the position determination entity 202 does not include data for a given space vehicle and when data in the mobile station 110 indicates that ephemeris data for the given space vehicle has already expired or is unavailable, the mobile station 110 marks the space vehicle as unhealthy. The mobile station 110 then does not base a refresh request on the unhealthy space vehicle until data indicates otherwise.

Figure 4:
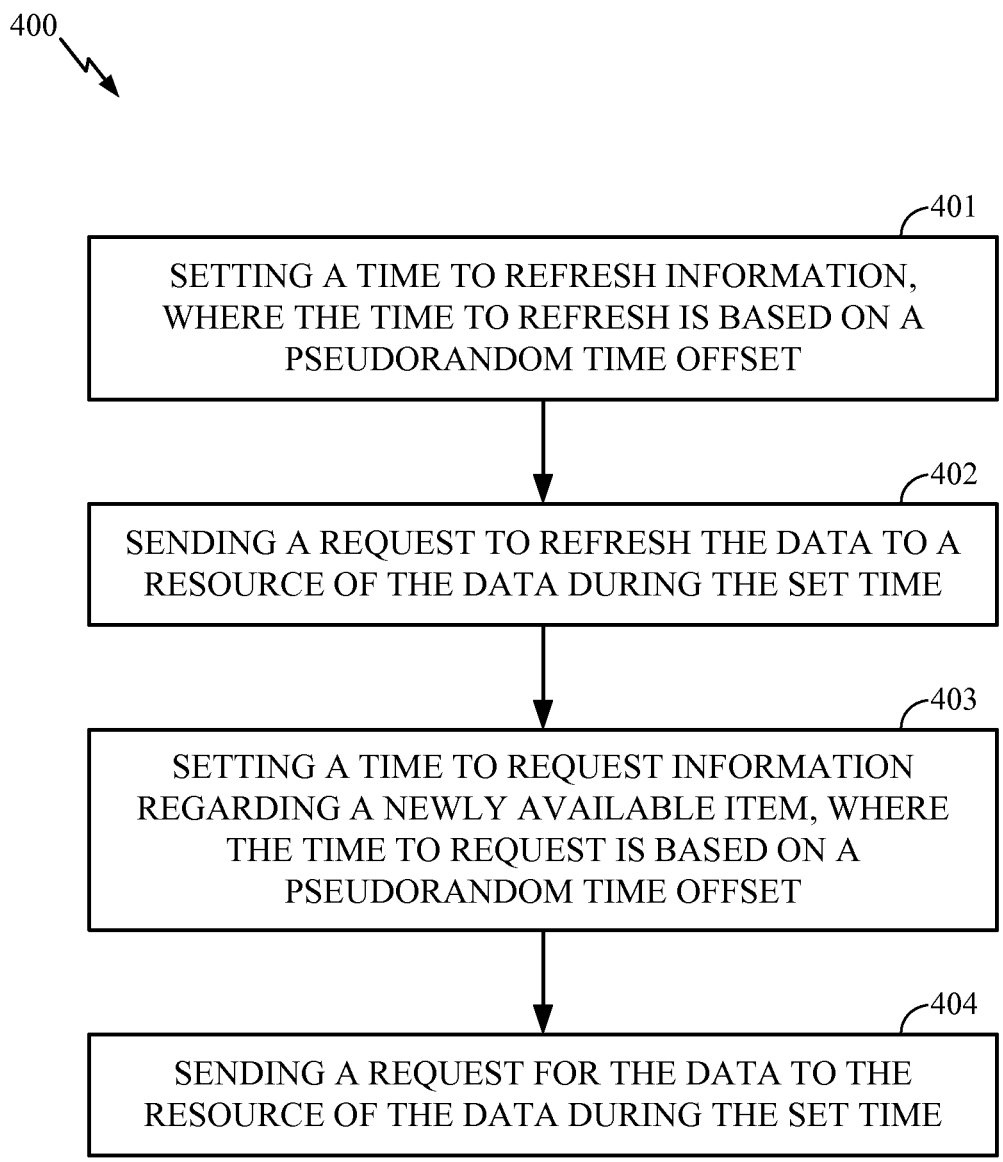
FIG. 4 is an illustration of an exemplary method adapted according to one aspect of the invention.

Various implementations of the invention include methods performed by a mobile station, such as the mobile station 110. FIG. 4 is an illustration of an exemplary method 400 adapted according to one aspect of the invention. In the block 401, a time to refresh information is set, where the time to refresh is based on a pseudorandom time offset. For instance, the time offset can be an offset from a starting point of a period, an ending point of a period, a time within a period, etc. In the example implementation of FIGS. 2 and 3, the set time is offset from the beginning point of the period T.

In one example, the refresh interval is chosen after (TOE+2 hours) so that the mobile station receives ephemeris data with a new TOE which will be valid for the next 4 hours or so. For example, a 15-minute refresh interval can be used, which starts at (TOE+2 hours+1 minute) and ends at (TOE+2 hours+16 minutes). In such an implementation, a large percentage of the mobile devices refresh ephemeris data only about every 4 hours, which significantly reduces the total number of sessions seen by a given position determination entity. The refresh interval chosen after (TOE+2 hours) also can reduce unnecessary requests from short-lived sessions, for example, lasting shorter than 4 hours.

The pseudorandom time offset can be generated in any of a variety of ways. For instance, many computing devices, including many cellular handsets, include pseudorandom number generators. Thus, in many implementations, the pseudorandom number generator that already exists in a handset can be used. In one example, a uniform pseudorandom number generator provides the integer number R (described above) between 0 and 149. Since the number is pseudorandomly generated, according to a uniform distribution, the chance that it will fall in a given slot of the 150 slots is approximately 1:150. Therefore, in a given MS, over time, a plot of R should show a substantially uniform distribution throughout the range of zero to 149. Similarly, for a large number of devices in communication with the same position determination entity and using the same technique, the position determination entity should see substantially uniformly distributed refresh requests, at least within a definable interval (e.g., interval T).

In order to provide substantially uniformly distributed refresh requests, the seeds provided to the random number generators of various devices should have negligible correlation from one device to another. One way to achieve negligible correlation, at least for cellular phone devices, is to use the phones' Electronic Serial Numbers (ESNs) in generating the seeds. In another example, seeds are associated with the time between device power up and session start. However, the invention is not limited to any particular method of seeding and/or generating pseudorandom numbers, as various implementations can use other techniques.

In the block 402, a request to refresh the data is sent to a resource of the data during the set time to refresh. For instance, a refresh request is sent to a position determination entity (a source, or resource, of the data) to request ephemeris data for one or more space vehicles, and the request is sent at the time to refresh that was set in block 401.

In the block 403, a time to request information regarding a newly available item (e.g., a newly visible space vehicle) is set, where the time to request is based on a pseudorandom time offset. The pseudorandom time offset can be the same or different time offset as the one in the block 401. In the block 404, the request for the data is sent according to the set time.

While the method 400 is shown as a series of specific, discrete steps, it should be noted that the invention is not so limited. Some implementations may add, omit, modify, or rearrange some actions. For instance, one implementation does not request data about a new space vehicle when a refresh request is set to be sent within a short time. Furthermore, a device may repeat one or more of the actions of blocks 401-403 over a period of minutes, hours, days, e.g., by requesting a refresh every time a TEEE is reached. Moreover, some devices may set no pseudorandom time to request data regarding a newly visible space vehicle.

While examples described above refer to requesting orbital data in an SPS, the invention is not so limited. Various non-SPS applications can be adapted according to embodiments of the invention. For example, any application that automatically and periodically requests refreshed data, such as stock quotes, news headlines, sports feeds, and/or the like can benefit from an implementation of the invention. In another example, an application that automatically and periodically synchronizes with a network can be adapted according to embodiments of the invention (e.g., a Personal Digital Assistant running Windows Mobile™ that downloads email, contacts, calendar entries, etc. from a network). In fact, any application where a large number of users request data refreshes from a single resource can benefit from some implementations. Furthermore, various features of the invention can be implemented in devices other than mobile or portable devices, such as desktop computers, intelligent appliances, and the like.

The examples above describe scenarios wherein an MS calculates its time offset, but some embodiments can be configured so an entity other than an MS calculates time offsets. In one example embodiment, an MS connects to a PDE to get its first download of ephemeris, and the PDE (or other server in the network) calculates and provides the MS with a pseudorandomly generated time offset which instructs the MS to delay its request for ephemeris data whenever the data is needed at an even hour expiration time. The PDE or other server can check that there are minimum collisions where multiple MSs in a service area use the same time-offset and adjust time offsets for one or more MSs if needed.

Various implementations of the invention provide advantages over prior art systems. As mentioned above, current implementations of assisted SPSs tend to see spikes in refresh requests at certain times, which can degrade performance and cause communication network loading issues and/or exhaust location server resources. Various implementations of the invention can be used to eliminate or limit the severity of spikes seen by position determination entities.

The methodologies described herein may be implemented in various networks and by various means depending upon the application. For example, the present disclosure applies to both synchronous and asynchronous cellular networks, such as (but not limited to) GSM, CDMA, WCDMA and UMTS. Moreover, these methodologies may be implemented in hardware, firmware, software, or a combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 160 of the mobile station 110, and executed by a processing unit, for example the processing unit 150 of the mobile station 110 (see FIG. 1). Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although the present invention and its advantages have been described in detail, it should be understood that various changes, substitutions and alterations can be made herein without departing from the technology of the invention as defined by the appended claims. Moreover, the scope of the present application is not intended to be limited to the particular aspects of the process, machine, manufacture, composition of matter, means, methods or steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present invention. Accordingly, the appended claims are intended to include within their scope such processes, machines, manufacture, compositions of matter, means, methods, or steps.

What is claimed is:

1. A device, of a plurality of devices, requesting data that is periodically refreshed, said device being a Satellite Positioning System (SPS)-enabled mobile station (MS) comprising:
a processing unit adapted to request a refresh of said data according to a time offset, said time offset falling within a designated one of a plurality of time slots within a defined interval, the defined interval including a start time and an end time respectively defined relative to a known expiration time of said data, the designated time slot within the defined interval being chosen pseudorandomly, wherein the data comprises orbital data for a plurality of resources comprising Space Vehicles (SVs), wherein the known expiration time is an earliest expiration time among expiration times associated with the plurality of resources, wherein the start time of the defined interval is defined as an orbital data expiration time of a first SV having an earliest orbital data expiration time among the SVs plus a specified delay, and wherein the designated time slot is generated using a remote device configured to pseudorandomly generate time offsets for the plurality of devices and provide the time offsets to the plurality of devices, each of the time offsets generated using the remote device corresponds to a respective one of the plurality of time slots such that the designated time slot corresponding to the time offset at which the processing unit of the device is configured to request the refresh is different from at least one other time slot from the plurality of time slots corresponding to at least one other time offset for at least one other of the plurality of devices configured to request a data refresh at the at least one other time slot.

2. The device of claim 1, wherein said mobile station is adapted to receive said data from a transmitter of a network, said network serving a plurality of other mobile stations that use said data.

3. The device of claim 1 wherein said processing unit is adapted to request said data from a server that provides said data to the plurality of devices.

4. The device of claim 1, wherein:
the time offset is a first time offset;
the defined interval is a first defined interval; and
the processing unit is adapted to request additional orbital data for an additional SV, the additional orbital data being requested according to a second time offset, the second time offset falling within a designated one of a plurality of time slots within a second defined interval, the second defined interval having a start time defined with respect to a time the additional space vehicle becomes newly visible to said SPS-enabled mobile station, the designated time slot with the second defined interval being chosen pseudorandomly.

5. A method for performing an update for a first device, of a plurality of devices, wherein said first device comprises a Satellite Positioning System (SPS)-enabled mobile station (MS) that uses information with a known expiration time, and wherein said first device operates within a network that accommodates the plurality of devices also using the information, said method comprising:
the first device setting a time for said first device to refresh said information, said set time to refresh falling within a time slot within a defined interval, the defined interval including a start time and an end time respectively defined relative to a known expiration time, a placement of said time slot within the defined interval being chosen pseudorandomly; and
the first device sending a refresh request to a server for said information, said refresh request sent during said set time to refresh, wherein the information comprises orbital information for a plurality of resources comprising Space Vehicles (SVs), wherein the known expiration time is an earliest expiration time among expiration times associated with the plurality of resources, and wherein the start time of the defined interval is defined as an orbital data expiration time of a first SV having an earliest orbital data expiration time among the SVs plus a specified delay;
wherein said set time to refresh is generated using a remote device configured to pseudorandomly generate refresh times for the plurality of devices and provide the refresh times to the plurality of devices, each of the refresh times generated using the remote device corresponding to a respective one of a plurality of time slots such that said set time to refresh falling within the time slot at which the first device sends the refresh request is different from at least one other time slot from the plurality of time slots corresponding to at least one other refresh time for at least one other of the plurality of devices configured to request a data refresh at the at least one other time slot.

6. The method of claim 5 wherein said time slot corresponds to a selected slot of the plurality of time slots within the defined interval.

7. A non-transitory computer-readable medium encoded with instructions which, when executed by a processing unit of a device, with the device being a Satellite Positioning System (SPS)-enabled mobile station (MS), cause the processing unit to perform an update, the instructions comprising:
code to receive data from a server, said data being periodically refreshed by sending a refresh request to said server;
code to send said refresh request according to a time offset, said time offset falling within a designated one of a plurality of time slots within a defined interval, the defined interval including a start time and an end time respectively defined relative to a known expiration time of said data, the designated time slot within the defined interval being chosen pseudorandomly; and
code to receive refreshed data from said server, wherein the data comprises orbital data for a plurality of resources comprising Space Vehicles (SVs'), wherein the known expiration time is an earliest expiration time among expiration times associated with the plurality of resources, and wherein the start time of the defined interval is defined as an orbital data expiration time of a first SV having an earliest orbital data expiration time among the SVs plus a specified delay;
wherein the designated time slot is generated using a remote device configured to pseudorandomly generate time offsets for a plurality of devices and provide the time offsets to the plurality of devices, each of the time offsets generated using the remote device falling within a respective one of the plurality of time slots such that the designated time slot corresponding to the time offset at which the processing unit of the device is configured to request the refresh is different from at least one other time slot from the plurality of time slots corresponding to at least one other time offset for at least one other of the plurality of devices configured to request a data refresh at the at least one other time slot.

8. The non-transitory computer-readable medium of claim 7, wherein the instructions further comprise:
code to use said data to produce output information.

9. The non-transitory computer-readable medium of claim 8 wherein said output information comprises location information presented upon a screen.

10. The non-transitory computer-readable medium of claim 7, wherein:
the time offset is a first time offset;
the defined interval is a first defined interval;
the instructions further comprise code to request additional orbital data for an additional space vehicle according to a second time offset, the second time offset falling within a designated one of a plurality of time slots within a second defined interval, the second defined interval having a start time defined with respect to a time the additional space vehicle becomes newly visible to a satellite positioning system (SPS)-enabled device comprising the processing unit, the designated time slot with the second defined interval being chosen pseudorandomly.

11. A satellite Positioning System (SPS)-enabled mobile station (MS) receiver, of a plurality of receivers, comprising:
means for calculating an expiration time for data;
means for scheduling a time interval associated with said expiration time, said time interval including a start time and an end time respectively scheduled relative to the expiration time and divided into a plurality of time slots;
means for pseudorandomly selecting a first time slot of said plurality of time slots;
means for requesting said data during said first time slot; and
means for receiving requested data, wherein the data comprises orbital data for a plurality of resources comprising Space Vehicles (SVs), wherein the expiration time is an earliest expiration time among expiration times associated with the plurality of resources, and wherein the start time of the defined interval is defined as an orbital data expiration time of a first SV having the earliest orbital data expiration time among the SVs plus a specified delay;
wherein the first time slot is determined using a remote device configured to pseudorandomly determine respective ones of the plurality of time slots for the plurality of receivers and provide the respective one of the plurality of time slots to the plurality of receivers, and wherein the first time slot during which the receiver requests the data is different from at least one other time slot from the plurality of time slots for at least one other of the plurality of receivers configured to request the data refresh at the at least one other time slot.

12. The receiver of claim 11, wherein:
the time interval is a first time interval;
the plurality of time slots are a first plurality of time slots; and
the receiver further comprises:
means for scheduling a second time interval having a start time scheduled with respect to a time an additional space vehicle becomes newly visible to the receiver, the second time interval divided into a second plurality of time slots, and
means for requesting additional orbital data for the additional space vehicle during a second time slot pseudorandomly chosen from the second plurality of time slots.

13. A method for performing an update for a first device of a plurality of devices, wherein said first device comprises a Satellite Positioning System (SPS)-enabled mobile station (MS) that uses information with a known expiration time, and wherein said first device operates within a network that accommodates other of the plurality of devices also using the information and includes base stations, said method comprising:
a base station receiving a request for said information from said first device;
the base station generating data indicating a time for said first device to refresh said information, said time to refresh falling within a time slot within a defined interval, the defined interval including a start time and an end time respectively defined relative to the known expiration time, a placement of said time slot within said defined interval being chosen pseudorandomly; and
the base station sending said generated data indicating the time to refresh to said first device, wherein the information comprises information for a plurality of resources comprising Space Vehicles (SVs), wherein the known expiration time is an earliest expiration time among expiration times associated with the plurality of resources, wherein the start time of the defined interval is defined as an orbital data expiration time of a first SV having the earliest orbital data expiration time among the SVs plus a specified delay;
wherein the base station is configured to pseudorandomly generate data indicating refresh times for the plurality of devices and provide the data indicating the refresh times to the plurality of devices, each of the refresh times corresponding to a respective one of a plurality of time slots such that the time slot corresponding to the indicated time for the first device at which the first device is configured to refresh said information is different from at least one other time slot from the plurality of time slots corresponding to at least one other refresh time for at least one other of the plurality of devices configured to refresh said information at the at least one refresh time.

14. The method of claim 13 wherein said time to refresh corresponds to a selected slot of the plurality of slots within the defined interval.

15. The method of claim 13, wherein the base station comprises a position determination entity within said network.

16. The method of claim 15, wherein said position determination entity comprises a server computer, and said network comprises a wireless network.

17. A device requesting data that is periodically refreshed, the device being a Satellite Positioning System (SPS)-enabled mobile station comprising:
a processing unit adapted to request a refresh of said data according to a time offset, said time offset falling within a designated one of a plurality of time slots within a defined interval, the defined interval including a start time and an end time respectively defined relative to a known expiration time of said data, the designated time slot within the defined interval being chosen pseudorandomly, wherein the data comprises orbital data for a plurality of resources comprising Space Vehicles (SVs), wherein the known expiration time is an earliest expiration time among expiration times associated with the plurality of resources, and wherein the start time of the defined interval is defined as an orbital data expiration time of a first SV with an earliest orbital data expiration time among the SVs plus a specified delay.

18. The device of claim 17, wherein the mobile station is adapted to receive said data from a transmitter of a network, said network serving a plurality of other mobile stations that use said data.

19. The device of claim 17 wherein said processing unit is adapted to generate said time offset.

20. The device of claim 17 wherein said processing unit is adapted to request said data from a server that provides said data to a plurality of other devices.

21. The device of claim 17, wherein:
the time offset is a first time offset;
the defined interval is a first defined interval; and
the processing unit is adapted to request additional orbital data for an additional SV, the additional orbital data being requested according to a second time offset, the second time offset falling within a designated one of a plurality of time slots within a second defined interval, the second defined interval including a second start time defined with respect to a time the additional space vehicle becomes newly visible to the SPS-enabled mobile station, the designated time slot with the second defined interval being chosen pseudorandomly.

22. The device of claim 17, wherein the designated time slot is chosen pseudorandomly using a pseudorandom number generated based on one of: a serial number of the device, or a power up time of the device.

23. A method for performing an update for a first device, wherein said first device comprises a Satellite Positioning System (SPS)-enabled mobile station (MS) that uses information with a known expiration time, and wherein said first device operates within a network that accommodates other devices also using the information, the method comprising:
setting, by the first device, a time for said first device to refresh said information, the set time to refresh falling within a time slot within a defined interval, the defined interval including a start time and an end time respectively defined relative to a known expiration time, a placement of the time slot within the defined interval being chosen pseudorandomly; and
sending, by the first device, a refresh request to a server for said information, the refresh request sent during the set time to refresh, wherein the information comprises orbital information for a plurality of resources comprising Space Vehicles (SVs), wherein the known expiration time is an earliest expiration time among expiration times associated with the plurality of resources, and wherein the start time of the defined interval is defined as an orbital data expiration time of a first SV with an earliest orbital data expiration time among the SVs plus a specified delay.

24. The method of claim 23, wherein the time slot corresponds to a selected slot of a plurality of slots within the defined interval.

25. The method of claim 23, wherein setting the time to refresh comprises:
generating a pseudorandom number using one of: a serial number of the first device, or a power up time of the first device; and
choosing the placement of the time slot within the defined interval based on the generated pseudorandom number.

26. A non-transitory computer-readable medium encoded with instructions which, when executed by a processing unit of a device, with the device being a Satellite Positioning System (SPS)-enabled mobile station (MS), performs an update, the instructions comprising:
code to receive data from a server, the data being periodically refreshed by sending a refresh request to the server;
code to send the refresh request according to a time offset, the time offset falling within a designated one of a plurality of time slots within a defined interval, the defined interval including a start time and an end time respectively defined relative to a known expiration time of the data, the designated time slot within the defined interval being chosen pseudorandomly; and
code to receive refreshed data from the server, wherein the data comprises orbital data for a plurality of resources comprising Space Vehicles (SVs'), wherein the known expiration time is an earliest expiration time among expiration times associated with the plurality of resources, and wherein the start time of the defined interval is defined as an orbital data expiration time of a first SV with an earliest orbital data expiration time among the SVs plus a specified delay.

27. The non-transitory computer-readable medium of claim 26, wherein the instructions further comprise:
code to use the data to produce output information comprising location information presented upon a screen.

28. The non-transitory computer-readable medium of claim 26, wherein:
the time offset is a first time offset;
the defined interval is a first defined interval;
the instructions further comprising code to request additional orbital data for an additional space vehicle according to a second time offset, the second time offset falling within a designated one of a plurality of time slots within a second defined interval, the second defined interval including a second start time defined with respect to a time the additional space vehicle becomes newly visible to the device comprising the processing unit, the designated time slot with the second defined interval being chosen pseudorandomly.

29. The non-transitory computer-readable medium of claim 26, wherein the designated time slot is chosen pseudorandomly using a pseudorandom number generated based on one of: a serial number of the device in which the processing unit is located, or a power up time of the device in which the processing unit is located.

30. A satellite Positioning System (SPS)-enabled mobile station (MS) receiver comprising:
means for calculating an expiration time for data;
means for scheduling a time interval associated with said expiration time, said time interval including a start time and an end time respectively scheduled relative to the expiration time and divided into a plurality of time slots;
means for pseudorandomly selecting a first time slot of the plurality of time slots;
means for requesting the data during the first time slot; and
means for receiving the requested data, wherein the data comprises orbital data for a plurality of resources comprising Space Vehicles (SVs), wherein the expiration time is an earliest expiration time among expiration times associated with the plurality of resources, and wherein the start time of the defined interval is defined as an orbital data expiration time of a first SV with the earliest orbital data expiration time among the SVs plus a specified delay.

31. The receiver of claim 30, wherein said means for pseudorandomly selecting comprises:
a random number generator configured to use one of: a serial number of the mobile station, a power up time of the mobile station.

32. The receiver of claim 30, wherein:
the time interval is a first time interval;
the plurality of time slots are a first plurality of time slots; and
the receiver further comprising:
means for scheduling a second time interval including a start time scheduled with respect to a time an additional space vehicle becomes newly visible to the receiver, the second time interval divided into a second plurality of time slots, and
means for requesting additional orbital data for the additional space vehicle during a second time slot pseudorandomly chosen from the second plurality of time slots.

* * * * *